US007669146B2

(12) United States Patent  
Lauff (10) Patent No.: US 7,669,146 B2  
(45) Date of Patent: Feb. 23, 2010

(54) INFORMATION ORGANIZATION NAVIGATION

(75) Inventor: Markus Lauff, Oftersheim (DE)

(73) Assignee: SAP Aktiengesellschaft, Walldorf (DE)

( * ) Notice: Subject to any disclaimer, the term of this patent is extended or adjusted under 35 U.S.C. 154(b) by 906 days.

(21) Appl. No.: 10/685,285

(22) Filed: Oct. 14, 2003

(65) Prior Publication Data

US 2005/0080793 A1  Apr. 14, 2005

(51) Int. Cl.  
G06K 15/00  (2006.01)

(52) U.S. Cl. ........................ 715/854; 715/810

(58) Field of Classification Search ................ 715/810, 715/814, 821, 826, 819, 841, 843, 845, 853–855, 715/712, 765, 767, 847  
See application file for complete search history.

(56) References Cited

U.S. PATENT DOCUMENTS

| | | | | |
|---|---|---|---|---|
| 6,832,353 | B2 * | 12/2004 | Itavaara et al. | 715/744 |
| 6,980,200 | B2 * | 12/2005 | Goren | 345/169 |
| 7,106,375 | B2 * | 9/2006 | Venturino et al. | 348/333.02 |
| 2004/0051804 | A1 * | 3/2004 | Veturino et al. | 348/333.12 |
| 2004/0104898 | A1 * | 6/2004 | Badarneh | 345/169 |
| 2004/0165012 | A1 * | 8/2004 | Nelson et al. | 345/828 |
| 2004/0165013 | A1 * | 8/2004 | Nelson et al. | 345/858 |
| 2005/0022140 | A1 * | 1/2005 | Vale | 715/864 |
| 2006/0274356 | A1 * | 12/2006 | Bellagamba et al. | 358/1.15 |

FOREIGN PATENT DOCUMENTS

| | | |
|---|---|---|
| EP | 1 333 362 | 8/2003 |
| JP | 03 182922 | 8/1991 |

OTHER PUBLICATIONS

Bread Crumbs, http://www.welie.com/patterns/showPattern.php?patternID=crumbs, pp. 2.  
What is menu?—A Word Definition From the Webopedia Computer Dictionary, Webopedia, http://www.pcwebopedia.com/TERM/m/menu.html, Feb. 25, 2003, pp. 1-3.  
European Patent Office, European Search Report, EP 04 02 4519, The Hague, Feb. 10, 2005, pp. 1-2.  
Kenneth Mason, Two-Pane Window for Dynamic Selection Path, Hampshire, GB, vol. 343, Nov. 1, 1992, XP000326548, p. 817.

* cited by examiner

*Primary Examiner*—Steven P Sax  
(74) *Attorney, Agent, or Firm*—Fish & Richardson P.C.

(57) ABSTRACT

Systems and techniques for navigating an organization of information may be used for navigating program functions, file directories, Web-sites, or any other appropriate organization of information. In one implementation, a navigation technique includes generating a one-dimensional navigation structure for an organization of information, the navigation structure comprising a plurality of elements, each element representing a portion of information, and detecting a command indicating selection of one of the elements in the navigation structure. The technique also includes determining whether the selected element has at least one associated element and, if the selected element has at least one associated element, modifying the navigation structure by deleting the non-selected elements from the navigation structure and adding the elements associated with the selected element to the navigation structure.

41 Claims, 5 Drawing Sheets

INFORMATION ORGANIZATION NAVIGATION

BACKGROUND

The following description relates to navigating through an organization of information, for example, through a function directory in a user interface of a computer.

There are many manners in which to present information to a computer user. One of the most popular is visual. Presenting information in a visual manner often involves using a user interface. In a user interface, a user is typically able to observe data and to select between elements for manipulating data and/or viewing data.

The selectable elements in user interfaces have, however, become increasingly more varied and numerous. To allow ease of use, therefore, the selectable elements typically have some type of organization, which is often hierarchical, and a user navigates through the elements to find the desired one.

There are many ways to allow a user to navigate through selectable elements in a user interface. One of the most popular is by the use of menus with pop-up windows for further levels in the organization hierarchy. In this navigation scheme, the selected menu and any subsequent pop-up windows are displayed until the user selects the appropriate element.

Another way to allow a user to navigate through selectable elements in a user interface is to use a multilevel navigation bar. In this navigation scheme, additional lines are added to the initial navigation bar as the user navigates, with one line being added per organization level in most cases. Thus, all previously presented elements are displayed until the proper element is selected. This scheme may be used in either horizontal or vertical orientations.

A further way to allow a user to navigate through selectable elements in a user interface is to use multiple navigation bars. Such a scheme typically has an initial, top-level bar that is horizontal and subsequent ones at a vertical location. This scheme is often used when the structure of the organization is complex and the space available to display the elements is fixed to a designated area.

SUMMARY

The present application describes systems and techniques relating to navigating an organization of information. In general, information organization navigation allows a user to move through and be presented with logically organized information, such as, for example, a file directory.

In one general aspect, a method for information organization navigation includes generating a one-dimensional structure for an organization of information, the navigation structure including a plurality of elements, each element representing a portion of information, and detecting a command indicating selection of one of the elements in the navigation structure. The method also includes determining whether the selected element has at least one associated element and, if the selected element has at least one associated element, modifying the navigation structure by deleting the non-selected elements from the navigation structure and adding the elements associated with the selected element to the navigation structure. Adding the elements associated with the selected element may include appending the associated elements to the selected element. The method may be performed by a device, by an article including a machine-readable medium storing instructions operable to cause one or more machines to perform operations, by hand, or by any other appropriate technique.

In certain implementations, generating a one-dimensional navigation structure for an organization of information includes generating a user interface including a navigation portion, the navigation portion comprising the elements. In these implementations, deleting the non-selected elements and adding the elements associated with the selected element may include placing at least part of one of the associated elements in navigation portion space that was occupied by one of the non-selected elements or the selected element. The navigation portion may be a horizontal navigation bar, and the user interface may be a graphical user interface.

Particular implementations may include altering the presentation of the selected element so that the element is presented dissimilarly to the added elements.

Certain implementations may include performing a function or presenting data represented by the selected element if the selected element does not have at least one associated element.

Some implementations may include detecting a command indicating selection of one of the added elements in the navigation structure, determining whether the selected added element has at least one associated element, and, if the selected added element has at least one associated element, modifying the navigation structure by deleting the non-selected added elements from the navigation structure and adding the elements associated with the selected added element to the navigation structure. Furthermore, the method may include altering the presentation of the selected added element in the navigation structure so that the element is presented dissimilarly to the added elements. Additionally, the method may include detecting a command indicating selection of a previously selected element in the navigation structure and modifying the navigation structure by deleting elements added after the selected previously selected element from the navigation structure and adding elements associated with the selected previously selected element to the navigation structure.

In another general aspect, a method for information organization navigation includes generating a user interface including a navigation portion having a plurality of elements in a first level of a hierarchy of elements and detecting a command indicating selection of one of the elements in the navigation portion. The method also includes determining whether the selected element has at least one associated element in a second level of the hierarchy, the second level being lower than the first level, and, if the selected element has at least one associated element in a second level of the hierarchy, modifying the navigation portion by deleting the non-selected first-level elements from the navigation portion and adding the second-level elements associated with the selected element to the navigation portion. Deleting the non-selected first-level elements and adding the elements associated with the selected element may include placing at least part of one of the associated elements in navigation portion space that was occupied by one of the non-selected elements or the selected element. The method may be performed by a device, by an article including a machine-readable medium storing instructions operable to cause one or more machines to perform operations, by hand, or by any other appropriate technique.

Certain implementations may include altering the appearance of the selected element in the navigation portion so that the element appears dissimilar to the associated second-level elements.

Particular implementations may include performing a function or presenting data represented by the selected element if the selected element does not have at least one associated element in the second level of the hierarchy.

Some implementations may include detecting a command indicating selection of one of the second-level elements in the navigation portion, determining whether the selected second-level element has at least one associated element in a third level of the hierarchy, the third level being lower than the second level, and, if the selected second-level element has at least one associated element in a third level of the hierarchy, modifying the navigation portion by deleting the non-selected second-level elements from the navigation portion and adding the third-level elements associated with the selected second-level element to the navigation portion. Some implementations may include altering the appearance of the selected second-level element in the navigation portion so that the element appears dissimilar to the associated third-level elements. Particular implementations may include detecting a command indicating selection of an element at least two levels higher than the lowest-level element in the navigation portion and modifying the navigation portion by deleting elements lower than the selected higher-level element in the hierarchy from the navigation portion and adding elements associated with the selected higher-level element to the navigation portion.

In another general aspect, a method for user interface navigation includes generating a graphical user interface including a navigation bar having a one-dimensional navigation structure, the navigation structure including a plurality of elements, each element representing data or a function, and detecting a command indicating selection of one of the elements in the navigation bar. The method also includes determining whether the selected element has at least one associated element and, if the selected element has at least one associated element, modifying the navigation bar by deleting the non-selected elements from the navigation bar and adding the elements associated with the selected element to the navigation bar such that at least part of one of the associated elements occupies navigation bar space that was occupied by one of the non-selected elements or the selected element, and the elements associated with the selected element are appended to the selected element. The method additionally includes altering the appearance of the selected element in the navigation bar so that the element appears dissimilar to the added elements and performing a function or presenting data represented by the selected element if the selected element does not have at least one associated element. The method further includes detecting a command indicating selection of one of the added elements in the navigation bar, determining whether the selected added element has at least one associated element, and, if the selected added element has at least one associated element, modifying the navigation bar by deleting the non-selected added elements from the navigation bar and adding the elements associated with the selected added element to the navigation bar. The method also includes altering the appearance of the selected added element in the navigation bar so that the element appears dissimilar to the added elements, performing a function or presenting data represented by the selected added element if the selected added element does not have at least one associated element, detecting a command indicating selection of a previously selected element in the navigation bar, and modifying the navigation bar by deleting elements added after the selected previously selected element from the navigation bar and adding elements associated with the selected previously selected element to the navigation bar.

Details of one or more implementations are set forth in the accompanying drawings and the description below. Other features may be apparent from the description and drawings, and from the claims.

BRIEF DESCRIPTION OF THE DRAWINGS

Like reference symbols in the various drawings indicate like elements.

DETAILED DESCRIPTION

The systems and techniques described herein relate to generating a navigation structure for an organization of information, presenting the navigation structure to a user, and allowing the user to navigate the information organization using the navigation structure. In particular implementations, for example, the systems and techniques relate to generating a navigation structure for a hierarchical organization of software program functions and presenting the navigation structure in a user interface. However, the systems and techniques may be used for navigating through any type of logical organization of information.

Figure 1A:
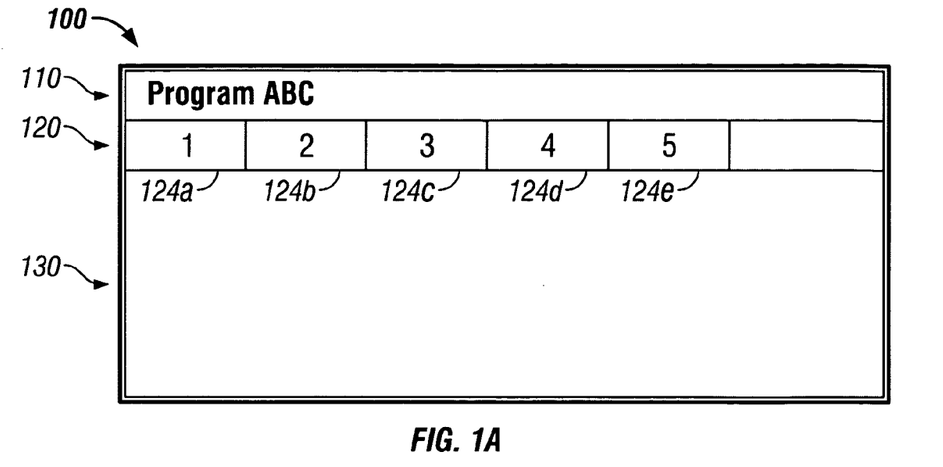
FIGS. 1A-C illustrate one implementation of information organization navigation.
Figure 1B:
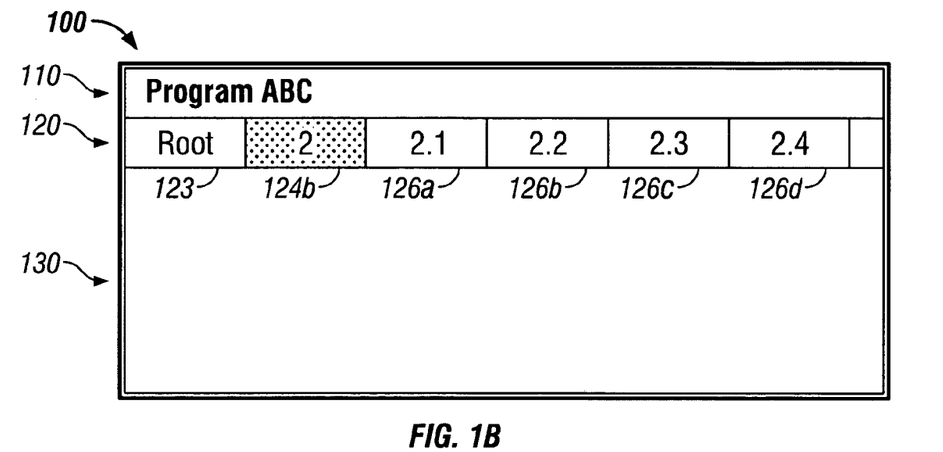
Figure 1C:
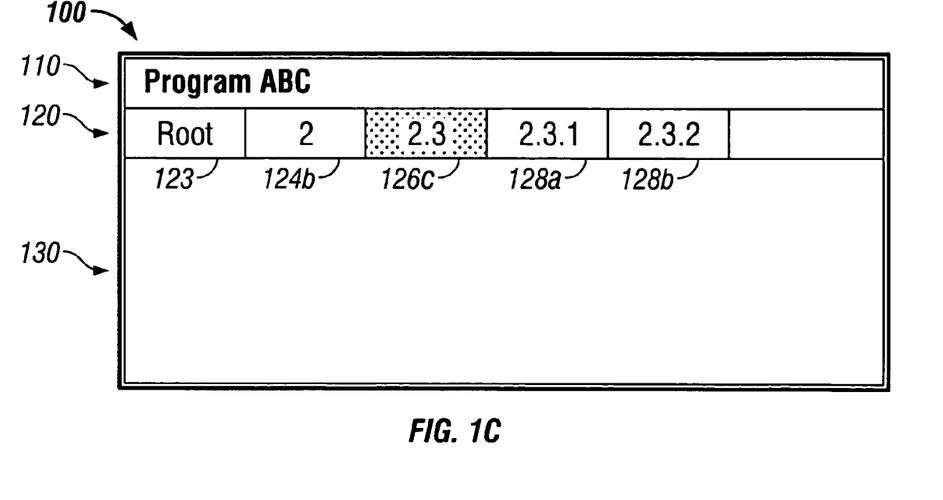

FIGS. 1A-C illustrate one implementation of information organization navigation. As illustrated, the information organization is presented in a user interface 100. User interface 100 includes a program data portion 110, a navigation portion 120, and a data portion 130. Program data portion 110 contains data about a software program that is using user interface 100. Program data portion 110 may, for example, be a title bar. Navigation portion 120 allows a user to navigate through functions of the program. Navigation portion 120 may, for example, be a menu bar. Data portion 130 contains data from and/or to be sent to the program that is using user interface 100. The data may be text, graphics, measurements, or any other appropriate data.

As illustrated in FIG. 1A, navigation portion 120 includes elements 124. Elements 124 could represent functions to be performed by and/or for the underlying program, such as, for example, opening a file, closing a file, saving a file, and closing the program, functions to be performed on data in portion 130, such as, for example, cut, copy, and paste, a grouping of elements that represent functions and/or other groupings of elements that represent functions, and/or any other information regarding the functions for a program. As presented in navigation portion 120, the elements have been mapped to a navigation structure for navigating the functions of the program, which will be discussed in more detail below. The elements may be selected by any appropriate user input device (e.g., a mouse or a keyboard).

If one of elements 124 represents a function, the function is performed when the element is selected. The user interface may or may not continue to be presented if such an element is selected. If one of elements 124 represents a grouping of elements, the elements associated with the element are presented when the element is selected.

For instance, assume that element 124b is selected and has other elements associated therewith. FIG. 1B illustrates the display of the associated elements. Navigation portion 120 now contains element 124b and elements 126. Elements 126 are the elements associated with element 124b. Thus, the ones of elements 124 that were not selected (i.e., element 124a and elements 124c-124e) have been deleted from the navigation structure presented in navigation portion 120, and the elements associated with element 124b (i.e., elements 126) have been added to the navigation structure. A two-dimensional information organization, therefore, has been mapped to a one-dimensional navigation structure. Also, the space for the ones of elements 124 that were not selected has been reused. Additionally, element 124b has been modified to have a different appearance than elements 126. This allows a user to readily identify the level that the navigation portion 120 is currently presenting. Navigation portion 120 also contains a navigation structure element 123 that allows navigation back to the version of navigation structure in FIG. 1A.

As with elements 124, if one of elements 126 represents a function, the function is performed when the element is selected. User interface 100 may or may not continue to be presented after performing the function. Furthermore, if the user interface continues to be presented, the navigation structure may remain in the state shown in FIG. 1B or return to its original state, shown in FIG. 1A. If, however, one of elements 126 represents a grouping of elements, the associated elements are presented in navigation portion 120.

For example, assume that element 126c is selected and has other elements associated therewith. FIG. 1C illustrates the display of the associated elements. As illustrated, the navigation structure presented in navigation portion 120 now contains element 123, element 124b, element 126c (i.e., the element just selected), and elements 128. Elements 128 are the elements associated with element 126c. Thus, the ones of elements 126 that were not selected (i.e., elements 126a-b and element 126d) have been deleted from the navigation structure, and the elements associated with element 126c (i.e., elements 128) have been added to the navigation structure. Thus, a three-dimensional information organization has been mapped to a one-dimensional navigation structure. Furthermore, element 126c has been modified to have a different appearance than elements 128. This allows a user to readily identify the level that the navigation portion is currently presenting.

The process of mapping an information organization to a one-dimensional navigation structure, presenting a group of elements for the navigation structure, determining whether a selected element has associated elements, deleting the non-selected elements, and adding the associated elements may continue for any number of cycles.

The navigation structure also allows return to a previously selected element. For example, assume that elements associated with element 126c (i.e., elements 128) have been added as in FIG. 1C. Selecting element 124b would return the navigation structure to its state in FIG. 1B. That is, the navigation structure would move back one level. Thus, elements 126 would be available again for selection. Note that the appearance of element 126c may or may not indicate that it has been selected previously.

User interface 100 may be implemented for any of a variety of computerized devices and environments. For example, the user interface may be implemented on a personal computer (PC), a personal digital assistant (PDA), or a cellular telephone. As another example, the device on which the user interface is implemented may be operating in a stand-alone mode or interacting with another device. Computerized devices often interact with other devices through client-server or peer-to-peer relationships.

User interface 100 has a variety of features. For example, because the navigation structure deletes the elements that are not selected during navigation and reuses the navigation portion space, the amount of space consumed by navigation portion 120 is reduced. Thus, available viewing space for other information may be increased and/or not overlayed as often, if ever. This may be particularly useful for systems with limited display areas, such as PDAs and cellular phones. Furthermore, by deleting the non-selected elements at each level and reusing the space, more navigation levels may be shown. This may be useful for systems with relatively large display areas, as even they may run out of space if three levels are presented with all elements. With the discussed technique, however, navigation schemes with ten or more levels are possible. For instance, if a user had navigated to the tenth organization level, the ten elements plus the elements representing the functions and/or groupings available at the tenth level would be presented in the navigation portion. As an additional example, by maintaining a representation of the previous levels, user interface 100 allows a user to more readily understand where he is in the navigation process. This assists the user in understanding what functions are available by providing context for the functions and in learning the information organization.

Although FIGS. 1A-C illustrate one implementation of information organization navigation, other navigation techniques may have a different arrangement and/or presentation. For example, instead of the horizontal orientation shown for navigation portion 120 in user interface 100, a navigation portion may have a vertical or other appropriate orientation. In particular implementations, the navigation portion may even be split (e.g., at the most recently selected element) or may use multiple lines if its original space is exceeded. This does not, however, affect the fact that the navigation structure is one-dimensional. Furthermore, the navigation portion may be at any location in the user interface. As another example, while the currently selected element is illustrated as being dissimilar in appearance to the newly added elements in the navigation portion, the other elements in the navigation portion may also be dissimilar to the newly added elements, or even to each other. Furthermore, the newly added elements may have an appearance dissimilar to each other. For instance, elements that represent functions may appear dissimilar to elements that have associated elements. In other implementations, however, all elements may have a similar appearance.

Additionally, other organizations of information may be presented in a navigation portion of a user interface using the described navigation structure. For example, the navigation structure may assist in navigating a file directory in which programs and/or files containing data are grouped into folders, each of the programs and/or files representing a portion of information. Note that while the programs and/or files may be organized in a logical manner in the directory structure, they may not actually be stored in an organized manner. If this is the case, tables in an operating system may be used to map the stored programs and/or files to the directory structure.

In operation, a user would move through the file directory by selecting folders and viewing their contents. For each selected folder, the navigation structure would delete the folders having a comparable level in the file directory and display the contents of the selected folder, which could be additional folders, programs, and/or files. Once an appropriate information portion is reached, selecting the portion (e.g., by double clicking on it) opens it. Note that opening a file may also entail starting an associated program.

As another example, the navigation structure may assist in navigating a Web-site. The pages of a Web-site typically have links to other pages. Thus, the navigation structure may present the Web-pages visited along with the pages that may be accessed at the currently viewed page.

Figure 2:
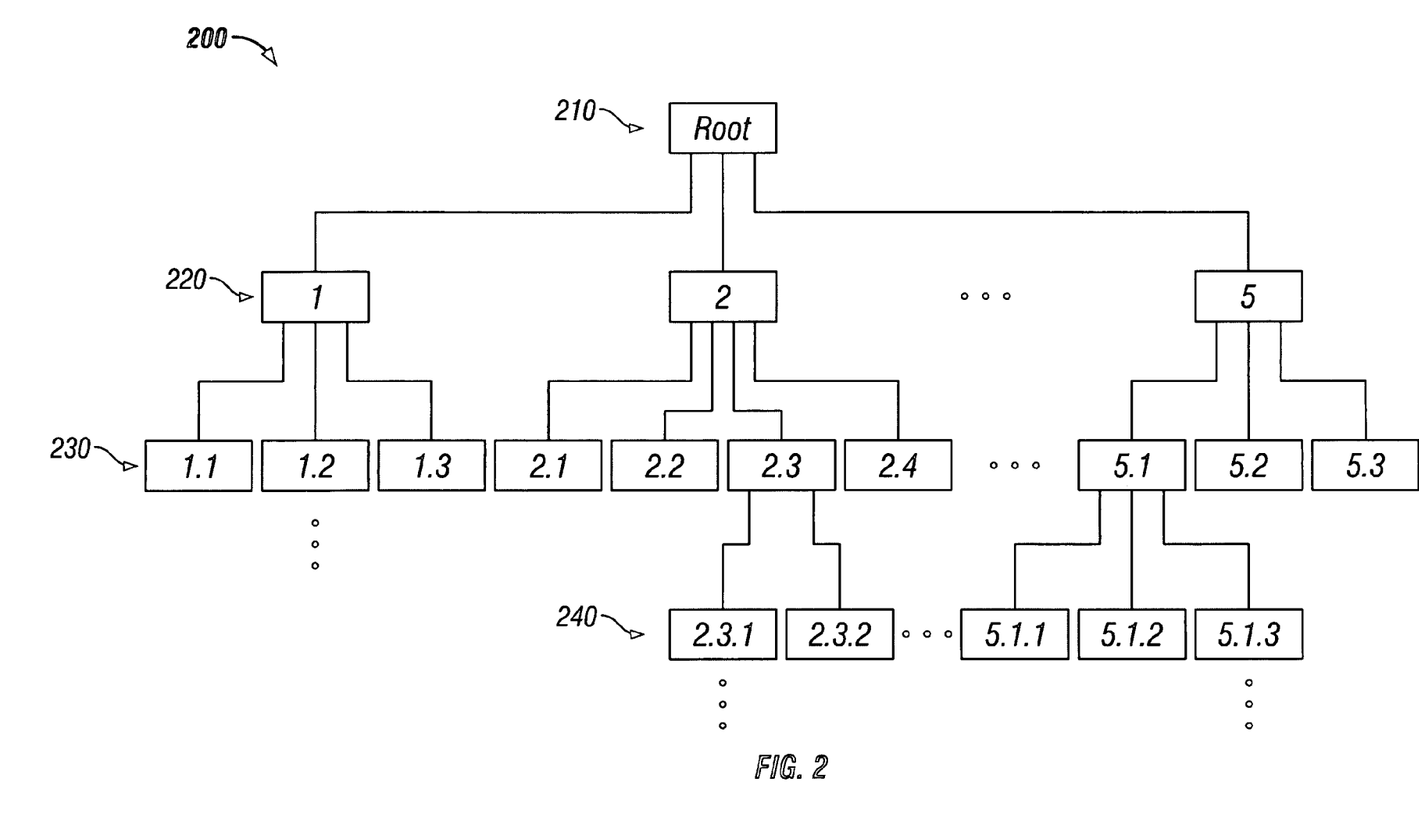
FIG. 2 illustrates an information organization for the information organization navigation in FIG. 1.

FIG. 2 illustrates an information organization 200 that navigation portion 120 of user interface 100 may present as a navigation structure. Thus, information organization 200 may represent an organization of user-interface accessible functions for a computer program. Similar organizations may be used for other information, such as, for example, file directories or Web-site pages.

As illustrated, information organization 200 includes a first level 210, a second level 220, a third level 230, and a fourth level 240. In general, the functions represented by the organization become increasingly more detailed from level 210 to level 220 to level 230 to level 240. Thus, a function may be represented by an element at a low level such as level 230 or level 240, elements that represent similar functions may be associated with an element at an intermediate level such as level 220 or level 230, and groups of elements representing elements may be associated at an upper level such as level 210 or level 220. Accessing a function may be accomplished by beginning at first level 210 and specifying more and more detail about the function until it is reached.

As illustrated, first level 210 corresponds to the initial version of the navigation structure shown in the navigation portion in FIG. 1A. This version lists the elements in second level 220. When one of the elements in second level 220 is selected, the rest of the elements in level 220 in the navigation portion 120 are deleted, and the elements in third level 230 for the selected second-level element are placed in the navigation structure and presented in the navigation portion.

Depending on which element was selected in second level 220, the elements added from third level 230 may or may not have associated elements. If an element without an associated element is added and selected, the function associated with the element may be performed. If, however, an element with an associated element is added and selected, the non-selected elements in level 230 are deleted from the navigation structure and the associated elements in level 240 are added to the navigation structure.

Backward navigation is also available because the elements selected in each of the levels are still presented. Thus, if a user had navigated to the point where elements in fourth level 240 were being presented, an element in third level 230 and an element in second level 220 would also be presented. Selecting the displayed element in second level 220 then would delete the elements in fourth level 240 and the element in third level 230 from the navigation structure and add the elements in third level 230 associated with the selected second-level element to the navigation structure.

Although organization 200 illustrates an organization of information for a navigation structure presented by the navigation portion of user interface 100, other organizations may also be used therein, and/or other navigation portions may be used to present the organization. For example, an organization may have any number of levels. As another example, an organization may have a circular, flat, or other appropriate structure.

The navigation structure presented by navigation portion 120 may also be useful in information organization navigation using non-visual presentations. For example, in automated attendants for telephone systems, the organization of the available functions may be similar to information organization 200. Users, however, often become lost when they are only presented with the current set of functions available. For instance, if a user is presented with a group of functions in level 230, the user may not understand the functions because he does not remember what navigation path he took to arrive at these functions. However, by continuing to include the previously selected elements in the navigation structure, the user should better appreciate where he is in the information organization. Furthermore, by allowing the user to return to previously selected elements, the user should be able to navigate through the information organization more efficiently.

Figure 3:
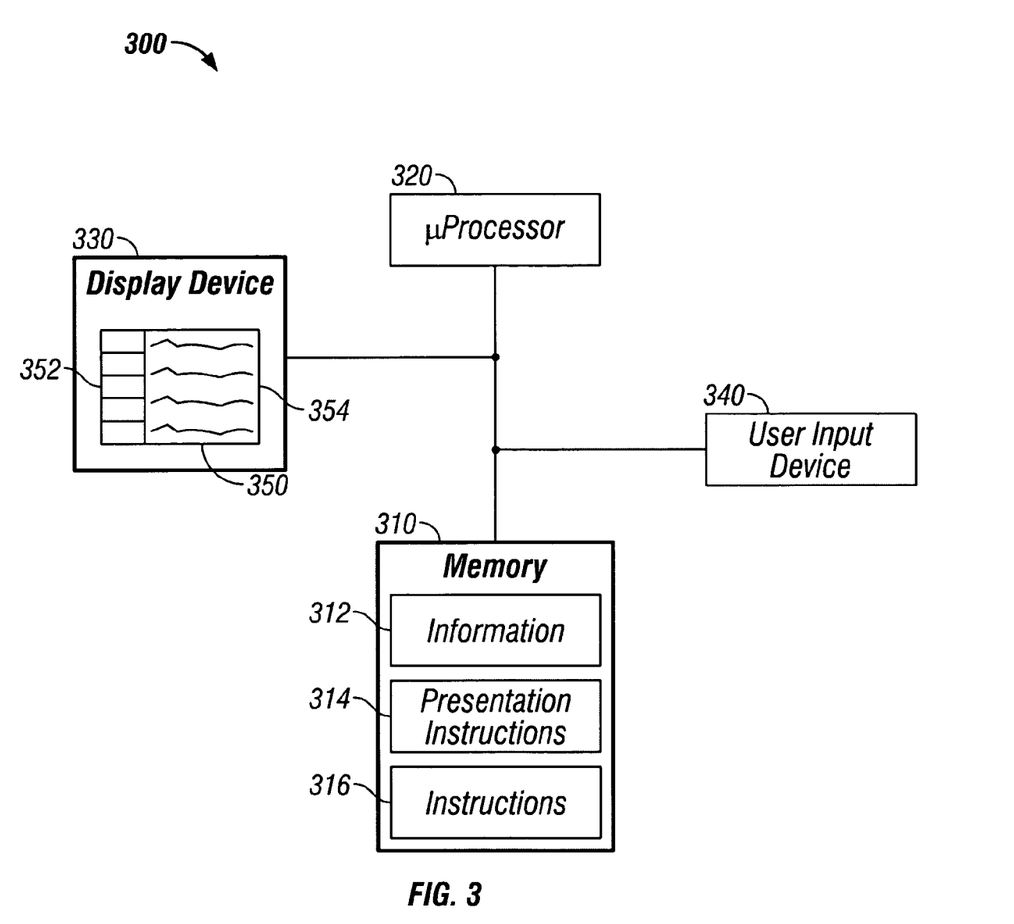
FIG. 3 is a block diagram illustrating a system for information organization navigation.

FIG. 3 illustrates a system 300 for information organization navigation. In general, system 300 includes memory 310, a microprocessor 320, a display device 330, and a user input device 340. Memory 310, microprocessor 320, display device 330, and user input device 340 cooperate with each other to generate, present, and modify a user interface 350. User interface 350 is presented by display device 330.

In more detail, memory may include random-access memory (RAM), read-only memory (ROM), compact-disk read-only memory (CD-ROM), registers, and/or any other type appropriate volatile or non-volatile information storage device. Memory 310 includes information 312, presentation instructions 314, and instructions 316. Information 312 may be the information to be presented in user interface 350. Presentation instructions 314 dictate how user interface 350 is to be presented and how user commands are to be interpreted. Presentation instructions 314 may or may not be an integral part of a program for manipulating information 312, such as, for example, a word-processing program or a spreadsheet program. Instructions 316 dictate the lower-level operations of system 300. Instructions 316 may, for example, be an operating system.

Microprocessor 320 is coupled to memory 310. Microprocessor 320 may be a complex-instruction-set computer (CISC), a reduced-instruction-set computer (RISC), or any other appropriate device for manipulating information in a logical manner. Microprocessor 320 operates according to the instructions in memory 310.

Display device 330 is coupled to microprocessor 320. Display device 330 may be a cathode ray tube (CRT) display, a liquid crystal display (LCD), or any other appropriate device for visually presenting information. Display device 330 visually presents user interface 350, which is generated by microprocessor 320.

User input device 340 is also coupled to microprocessor 320. User input device 340 may include a keyboard, a keypad, a mouse, a trackball, a stylus, a microphone, or any other appropriate device for detecting input from a user. When user input device 340 detects input from a user, user input device 340 generates an appropriate message for microprocessor 320.

In one mode of operation, microprocessor 320 generates user interface 350 according to presentation instructions 314. User interface 350 may be generated as part of a program that has been initiated, in response to a command detected by user input device 340, when system 300 is initiated, or in response to any other appropriate action. User interface 350 includes a navigation portion 352 containing a navigation structure and a data portion 354, which may include some portion of information 312. The instructions for generating the navigation structure in navigation portion 352 are part of the presentation instructions. After generating user interface 350, microprocessor 320 sends information regarding the user interface to display device 330, which visually presents the user interface.

Microprocessor 320 then waits to detect a user command indicating interaction with user interface 350. The interaction may be with the data in the user interface, with the navigation portion, or with any other appropriate part of the user interface.

If the command indicates interaction with navigation portion 352, microprocessor 320 determines whether an element in the navigation structure has been selected. If an element has been selected, microprocessor 320 determines whether the selected element represents a function or has associated elements.

If the selected element represents a function, microprocessor 320 performs the function represented by the selected element. For example, in most word processing programs, there is an element labeled "New" associated with a menu labeled "File". When the "New" element is selected, a new document is created. The new document may or may not have navigation portion 352 associated therewith. Moreover, it may have its own navigation portion.

If, however, the selected element has other elements associated therewith, microprocessor 320 modifies the navigation structure by deleting the non-selected elements of the same level as the selected element and adding the elements associated with the selected element. Adding the associated elements may, for example, be accomplished by appending the associated elements to the selected element. The modified navigation structure may then be presented in navigation portion 352 of user interface 350.

System 300 may continue to detect user interaction with navigation portion 352, determine whether the interaction indicates selection of a navigation structure element that has associated elements, and, if it does, delete the non-selected elements of the same level as the selected element and add the elements associated with the selected element for any number of levels.

System 300 also allows for backward navigation. After elements have been added to navigation portion 352 one or more times, meaning that navigation portion 352 now includes elements of different levels, a user may want to move back to a previous level. This may be accomplished by the user selecting a previously selected element, and microprocessor 320 determining whether the interaction with user interface 350 indicates selection of a previously selected element in the navigation structure. If a previously selected element has been selected, microprocessor 320 modifies the navigation structure by deleting the element(s) added after the currently selected element (e.g., the elements lower than the upper-level element) and adding the element(s) associated with the currently selected element. Note that because the currently selected element was selected previously, it should have associated elements; otherwise, the microprocessor would have simply performed the function represented by the element. The associated element(s) may be added by appending them to the currently selected element.

Although FIG. 3 illustrates a system for user interface navigation, other systems may have fewer, more, and/or a different arrangement of components. For example, a system may include a network interface device to allow communication with a remote computer. The remote computer may provide information and/or the user interface. The system may or may not generate a user interface based on a provided user interface. As another example, a system may have some of the instructions encoded on the processor. Moreover, the information in memory may be further segmented and/or consolidated. As a further example, a system may not include a user input device and a display device. For instance, the system may send information regarding the user interface to a remote terminal and receive user commands detected at the terminal.

A system similar to system 300 may also be used to provide navigation structures for non-visual information organization navigation. For example, processor 320 and memory 310 may be part of an automated attendant. Information 310 could store the functions and/or data for that a caller would need to access, and presentation instructions 314 would inform microprocessor 320 how to generate the navigation structure for the information. Such a system may also include voice recognition and/or voice synthesization technology.

Figure 4:
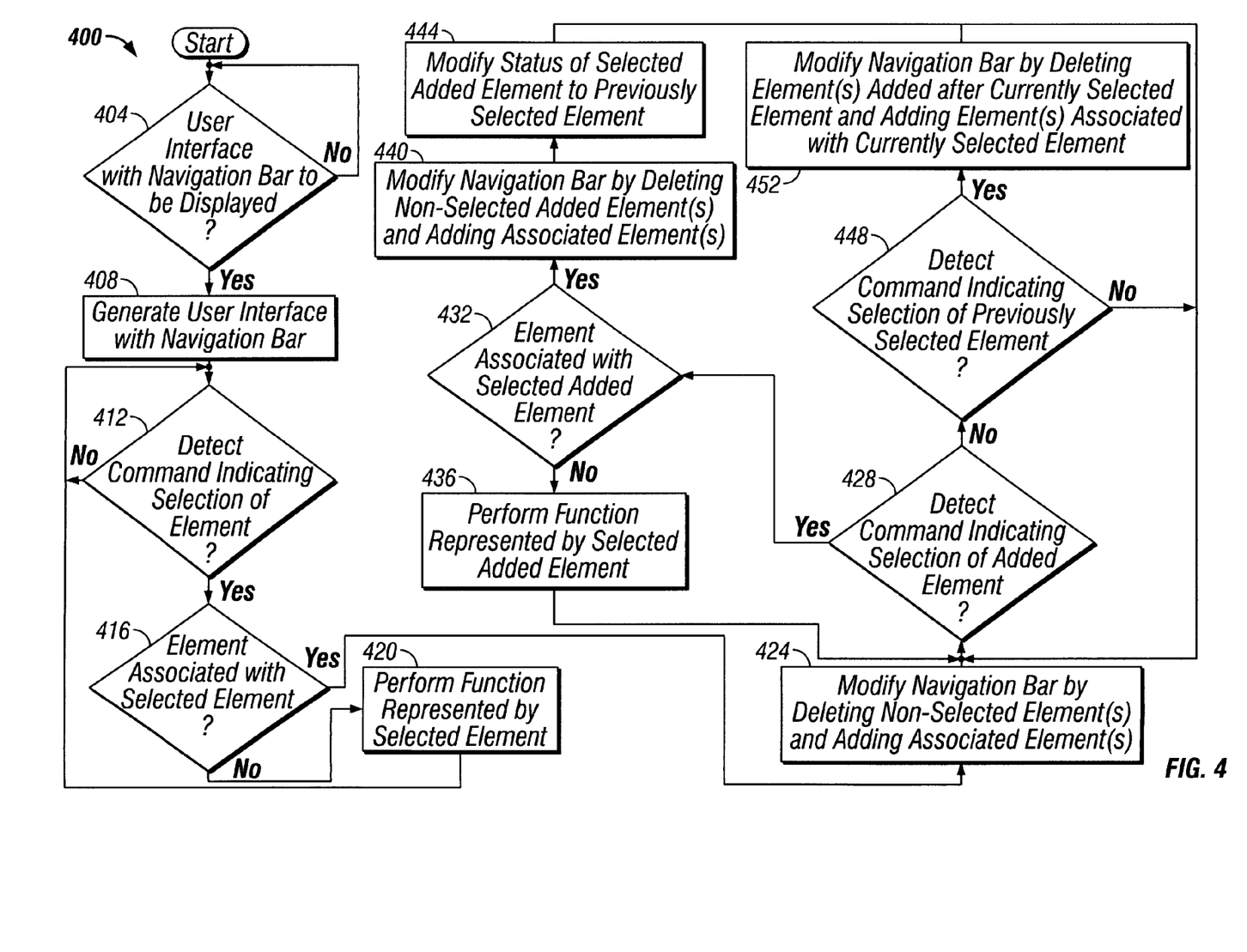
FIG. 4 is a flow chart illustrating a process for information organization navigation.

FIG. 4 is a flow chart illustrating a process 400 for information organization navigation. Process 400 may be implemented by a system similar to system 300 in FIG. 3.

Process 400 begins with determining whether a user interface with a navigation bar is to be displayed at decision block 404. User interfaces with navigation bars are typically found in a variety of software applications, such as, for example, word processing programs, spreadsheet programs, and Internet browsers. Determining whether a user interface with a navigation bar is to be displayed may be accomplished by detecting the activation of a program that uses such a user interface, by detecting the initiation of such a user interface in such a program, by detecting the initiation of a device that uses such a user interface, or by any other appropriate technique. Process 400 continues to wait at block 404 for such a user interface.

Once a user interface with a navigation bar is to be displayed, the process calls for generating the user interface at function block 408. The user interface may be a graphical user interface, a text-based user interface, a command-line user interface, or any other appropriate format for presenting visual information to a user. Regardless of form, however, the user interface has a navigation bar that has a variety of selectable elements, the selectable elements being part of a navigation structure. The elements may represent functions, groups of elements representing functions, or otherwise. The user interface may be presented to a user by a display device.

The process continues with waiting to detect a command indicating selection of a navigation bar element at decision block 412. The command may be detected through any appropriate user input device and interpreted by a processor. In particular implementations, the command is detected when a user highlights and selects an element with a pointing device (e.g., a mouse).

Once a command indicating selection of an element is detected, the process calls for determining whether an element is associated with the selected element at decision block 416. The associated element may represent a function, an element having associated elements, or otherwise. If no element is associated with the selected element, the process calls for performing the function represented by the selected element at function block 420. For example, in most word processing programs, there is an element labeled "Copy" associated with a menu labeled "Edit". Selecting the "Copy" element creates a copy of text that is currently highlighted in the user interface. The process then calls for returning to decision block 412 to check for another command indicating selection of an element.

If, however, an element is selected that has an associated element, the process calls for modifying the navigation bar by deleting the non-selected element(s) and adding the associated element(s) at function block 424. Deleting the non-selected element(s) and adding the associated elements(s) may, for example, be accomplished by appending the added element(s) to the selected element such that the space for the elements deleted from the navigation bar is reused. The modified navigation bar may then be presented to a user.

The process continues with determining whether a command indicating selection of an added element has been detected at decision block 428. If a command indicating selection of an added element has been detected, the process calls for determining whether an element is associated with the selected added element at decision block 432. If an element is not associated with the selected added element, the process call for performing the function represented by the selected added element at function block 436. The process then calls for returning to decision block 428 to check for another command indicating selection of an added element.

If, however, there is an element associated with the selected added element, the process continues with modifying the navigation bar by deleting the non-selected added element(s) and adding the associated element(s) at function block 440. The associated element(s) may, for example, be added by being appended to the selected added element such that the navigation bar space for the deleted non-selected added elements is reused. The process continues with modifying the status of the selected added element to be a previously selected element at function block 444. Modifying the status may be accomplished by modifying a state for the element, setting a flag for the element, or by any other appropriate technique by which the selected added element may be differentiated from the added associated elements.

The process then calls for returning to check for a command indicating selection of an added element at decision block 428. If an added element has been selected, the process calls for beginning to process the selected element at decision block 432. If, however, a command indicating selection of an added element has not been received, the process call for determining whether a command indicating selection of a previously selected element has been received at decision block 448. If a previously selected element has not been selected, the process calls for returning to check for a command indicating selection of an added element at decision block 428. The process may continue to check for an appropriate command at block 428 and block 448.

Once a command indicating selection of a previously selected element has been received, the process calls for modifying the navigation bar by deleting the element(s) added after the currently selected element and adding the element(s) associated with the currently selected element at function block 452. Note that because the currently selected element was selected previously, it should have associated elements; otherwise, the process would have performed the function represented by the element without making the element a previously selected element. The associated element(s) may, for example, be added by appending them to the currently selected element. The process then calls for returning to decision block 428.

Although FIG. 4 illustrates a process for user interface navigation, other processes for user interface navigation may have fewer, additional, and/or a different arrangement of operations. For example, a process may not determine whether a user interface with a navigation bar is to be displayed and/or generate the user interface. For instance, the process may simply manage the user interface once it exists. Moreover, a navigation bar is not required. As another example, a process may end after a function represented by a selected element is performed. For instance, if the represented function closes a program for which the user interface is created, the process may end as the user interface will probably no longer be presented. As a further example, one or more of the previously selected elements may be made to have a dissimilar appearance to the added elements. Thus, a user may be able to more readily determine at which point he is in the navigation structure, and hence, the information organization. As an additional example, the navigation bar may return to its original state after an element representing a function is selected. As another example, the status of a selected element may not have to be modified at function block 444. Element status, for example, may be determined by examining the element's position in the navigation bar, the element's appearance in the navigation bar, or any other appropriate indicator. Furthermore, the status of all elements may be determined based on a logical organization such as a hierarchy, which may be stored in a table.

Figure 5:
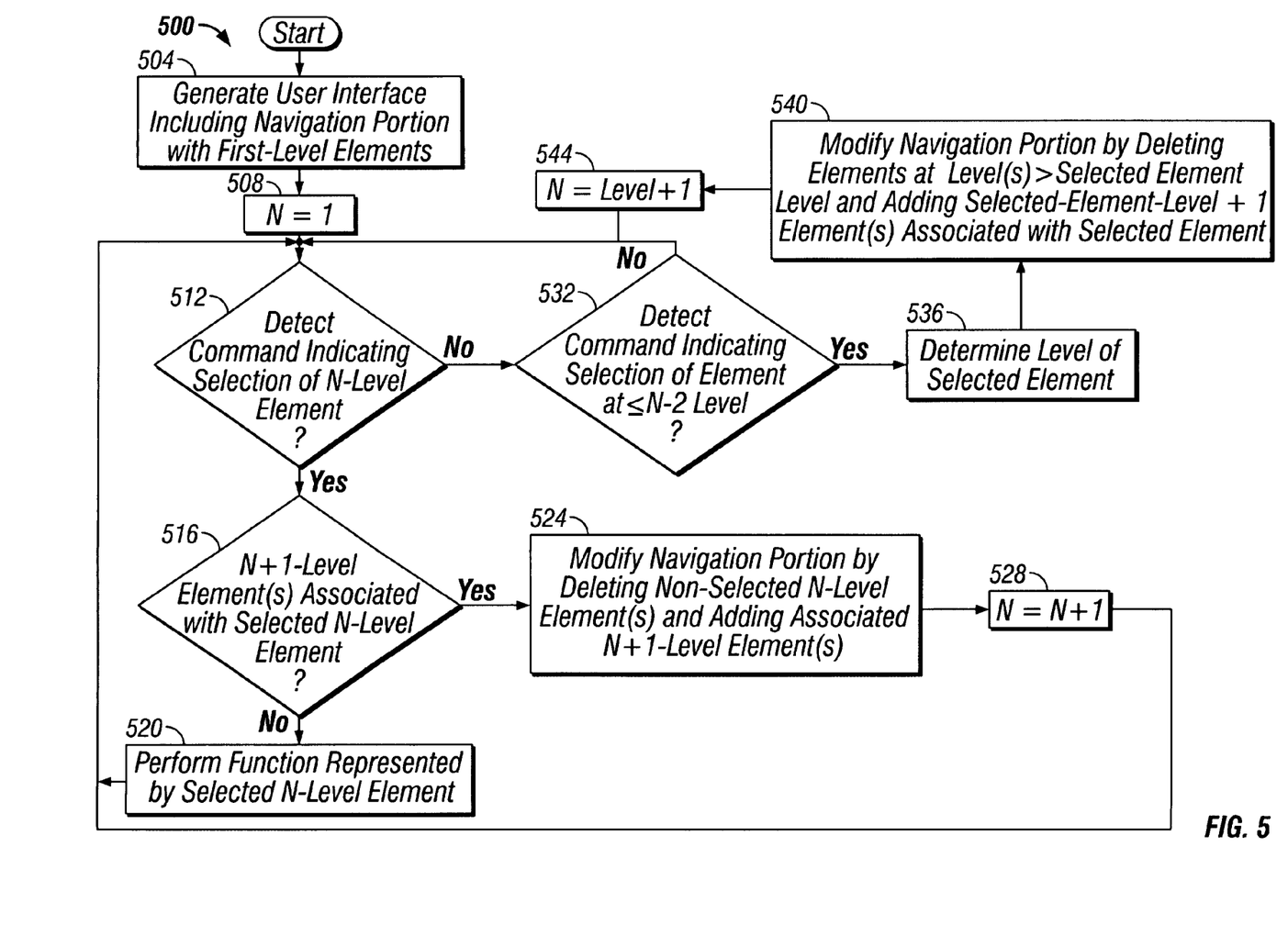
FIG. 5 is a flow chart illustrating a process for information organization navigation.

FIG. 5 is a flow chart illustrating a process 500 for information organization navigation. Process 500 may be implemented by a system similar to system 300 in FIG. 3.

Process 500 begins with generating a user interface including a navigation portion with first-level elements in a hierarchy at function block 504. The navigation portion may, for example, be a navigation portion, and the hierarchy of elements may be arranged in any appropriate manner, but is typically arranged beginning with abstract elements at the higher levels and moving towards more specific elements at the lower levels. The user interface may be presented to a user by a display device.

The process continues with initializing an identifier, N, at function block 508. The identifier indicates the lowest hierarchy level of the elements currently in the user interface.

The process calls for determining whether a command indicating selection of an N-level element has been detected at decision block 512. The command may be detected through any appropriate user input device and interpreted by a processor. In particular implementations, the command is detected when a user highlights and selects an N-level element with a pointing device (e.g., a mouse).

If a command indicating selection of an N-level element has been detected, the process calls for determining whether at least one N+1-level element is associated with the selected N-level element at decision block 516. An associated element may represent a function, an element having associated elements, or otherwise. If no N+1-level element is associated with the selected N-level element, the process calls for performing the function represented by the selected N-level element at function block 520. The process then calls for returning to decision block 512 to check for another command indicating selection of an N-level element.

If however, an N+1-level element is associated with the selected N-level element, the process calls for modifying the navigation portion by deleting the non-selected N-level element(s) and adding the associated N+1-level element(s) at function block 524. Deleting the non-selected N-level element(s) may include moving the selected element so that it is next to an element that is higher in the hierarchy, such as an N−1-level element. Adding the associated N+1-level elements(s) may, for example, be accomplished by appending the element(s) to the selected N-level element. The modified navigation portion may then be presented to a user.

The process continues with updating the identifier at function block 528. Thus, the identifier now indicates that elements one level lower in the hierarchy are currently the lowest in the navigation portion. The process then calls for returning to decision block 512 to check for additional commands indicating selection of an N-level element.

If there is no command indicating selection of an N-level element at decision block 512, the process calls for determining whether a command indicating selection of an element at least two levels above the lowest elements currently in the navigation portion has been detected at decision block 532. If no such command has been detected, the process calls for returning to decision block 512. The process may continue to cycle between decision block 512 and decision 532 until an appropriate command is detected.

If, however, a command indicating selection of an element at least two levels above the lowest elements currently in the navigation portion has been detected, the process calls for determining the hierarchy level of the selected element at function block 536. Determining the hierarchy level of the selected element may be accomplished by examining a hierarchy classifier associated with the element, by examining the element's position in the navigation portion, or by any other appropriate technique. After determining the hierarchy level for the selected element, the process continues with modifying the navigation portion by deleting element at levels lower than the level of the selected element and adding the next lower level element(s) associated with the selected element at function block 540. The process than continues with resetting the identifier to next lower level, as these are currently the lowest level in the user interface, and returning to decision block 512.

Although FIG. 5 illustrates a process for user interface navigation, other processes for user interface navigation may have fewer, additional, and/or a different arrangement of operations. For example, a process may initially determine whether a user interface with a navigation portion is to be displayed before proceeding with the process. As another example, a process may not generate the user interface. For instance, the process may simply manage the user interface once it exists. As a further example, a process may end after a function represented by a selected element is performed. For instance, if the represented function closes a program for which the user interface is created, the process may end if the user interface will no longer be presented. On the other hand, the process may have the navigation portion revert to its original state after an element representing a function is selected. As an additional example, one or more of the previously selected elements may be made to have a dissimilar appearance to the added elements. Thus, a user may be able to more readily determine at which point he is in a navigation hierarchy. As another example, an indicator for the lowest level elements in the user interface may not be used. Element status, for example, may be determined by examining the element's position in the navigation portion, the element's appearance in the navigation portion, or any other appropriate indicator. Furthermore, the status of all elements may be determined based on a logical organization such as a hierarchy, which may be stored in a table.

Various implementations of the systems and techniques described here may be realized in digital electronic circuitry, integrated circuitry, specially designed ASICs (application specific integrated circuits), computer hardware, firmware, software, and/or combinations thereof. These various implementations may include one or more computer programs that are executable and/or interpretable on a programmable system including at least one programmable processor, which may be special or general purpose, coupled to receive information and instructions from, and to transmit information and instructions to, a storage system, at least one input device, and at least one output device.

These computer programs (also known as programs, software, software applications, or code) may include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or information to a programmable processor, including a machine-readable medium that receives machine instructions as a machine-readable signal. The term "machine-readable signal" refers to any signal used to provide machine instructions and/or information to a programmable processor.

To provide for interaction with a user, the systems and techniques described here may be implemented on a computer having a display device (e.g., a CRT (cathode ray tube) or LCD (liquid crystal display) monitor) for visually presenting information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual, auditory, or tactile), and input from the user can be received in any form, including acoustic, speech, or tactile.

The systems and techniques described here may be implemented in a computing system that includes a back-end component (e.g., as a information server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system may be interconnected by any form or medium of digital information communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although only a few embodiments have been described in detail above, other modifications are possible. Portions of this disclosure discuss navigation for user interface and/or program functions. The systems and techniques discussed herein may be used to implement this navigation or navigation through other organized information. The logic flow depicted in FIG. 4 and FIG. 5 does not require the particular order shown, or sequential order, to achieve desirable results. In certain implementations, multitasking and parallel processing may be preferable.

Other embodiments may be within the scope of the following claims.

What is claimed is:

1. A computer-implemented method for visually presenting information in a compact display space, the method comprising:

generating a one-dimensional navigation structure for an organization of information, the navigation structure for presentation in the display space and comprising a plurality of elements, each element representing a portion of information in a first level of the information organization;

detecting a command indicating selection of one of the elements in the navigation structure;

determining whether the selected element has at least one associated element in a second level of the information organization; and if the selected element has at least one associated element in a second level of the information organization, modifying the navigation structure by deleting the non-selected first level elements from the navigation structure and inserting the second level elements associated with the selected element in the navigation structure, thereby conserving the display space while continuing to represent the information organization.

2. The method of claim 1, wherein generating a one-dimensional navigation structure for an organization of information comprises generating a user interface comprising a navigation portion, the navigation portion comprising the elements.

3. The method of claim 2, wherein deleting the non-selected first level elements and inserting the second level elements associated with the selected element comprises placing at least part of one of the associated elements in navigation portion space that was occupied by one of the non-selected elements or the selected element.

4. The method of claim 2, wherein the navigation portion comprises a horizontal navigation bar.

5. The method of claim 2, wherein the user interface comprises a graphical user interface.

6. The method of claim 1, further comprising altering the presentation of the selected first level element so that the element is presented dissimilarly to the inserted second level elements.

7. The method of claim 1, wherein inserting the second level elements associated with the selected element comprises appending the associated elements to the selected element.

8. The method of claim 1, further comprising performing a function or presenting data represented by the selected element if the selected element does not have at least one associated element.

9. The method of claim 1, further comprising:
  detecting a command indicating selection of one of the inserted elements in the navigation structure;
  determining whether the selected inserted element has at least one associated element in a third level of the information organization; and
  if the selected inserted element has at least one associated element in a third level of the information organization, modifying the navigation structure by deleting the non-selected second level elements from the navigation structure and inserting the third level elements associated with the selected inserted element in the navigation structure.

10. The method of claim 9, further comprising altering the presentation of the selected inserted element in the navigation structure so that the element is presented dissimilarly to the inserted third level elements.

11. The method of claim 9, further comprising:
  detecting a command indicating selection of a previously selected element in the navigation structure; and
  modifying the navigation structure by deleting elements inserted after the selected previously selected element from the navigation structure and inserting elements in a level of the information organization below the selected previously selected element and associated with the selected previously selected element in the navigation structure.

12. A system for visually presenting information in a compact display space, the system comprising:
  a memory operable to store navigation structure instructions;
  a processor coupled to the memory, the processor operable to:
    generate a one-dimensional navigation structure for an organization of information, the navigation structure for presentation in the display space and comprising a plurality of elements, each element representing a portion of information in a first level of the information organization;
    determine whether a command indicating selection of one of the elements in the navigation structure has been detected,
    determine whether the selected element has at least one associated element in a second level of the information organization, and
    if the selected element has at least one associated element in a second level of the information organization, modify the navigation structure by deleting the non-selected first level elements from the navigation portion and inserting the second level elements associated with the selected element in the navigation structure, thereby conserving the display space while continuing to represent the information organization.

13. The system of claim 12, wherein generating a one-dimensional navigation structure for an organization of information comprises generating a user interface comprising a navigation portion, the navigation portion comprising the elements.

14. The system of claim 13, further comprising:
  a display device coupled to the processor, the display device operable to visually present the navigation structure; and
  a user input device coupled to the processor, the user input device operable to detect the command indicating selection of one of the elements.

15. The system of claim 13, wherein deleting the non-selected first level elements and inserting the second level elements associated with the selected element comprises placing at least part of one of the associated elements in navigation portion space that was occupied by one of the non-selected elements or the selected element.

16. The system of claim 12, wherein the processor is further operable to alter the presentation of the selected first level element so that the element is presented dissimilarly to the inserted second level elements.

17. The system of claim 12, wherein the processor is further operable to perform a function or present data represented by the selected element if the selected element does not have at least one associated element.

18. The system of claim 12, wherein the processor is further operable to:
  determine whether a command indicating selection of one of the inserted elements in the navigation portion has been detected;
  determine whether the selected inserted element has at least one associated element in a third level of the information organization; and
  if the selected inserted element has at least one associated element in a third level of the information organization, modify the navigation structure by deleting the non-selected second level elements from the navigation structure and inserting the third level elements associated with the selected inserted element in the navigation structure.

19. The system of claim 18, wherein the processor is further operable to alter the presentation of the selected inserted element in the navigation structure so that the element is presented dissimilarly to the inserted third level elements.

20. The system of claim 18, wherein the processor is further operable to:

determine whether a command indicating selection of a previously selected element in the navigation portion has been detected; and modify the navigation portion by deleting elements inserted after the selected previously selected element from the navigation structure and inserting elements in a level of the information organization below the selected previously element and associated with the selected previously selected element in the navigation structure.

21. An article of manufacture comprising a physical machine-readable storage medium, the medium storing instructions operable to cause one or more machines to perform operations for visually presenting information in a compact display space, the operations comprising:

generating a one-dimensional navigation structure for an organization of information, the navigation structure for presentation in the display space and comprising a plurality of elements, each element representing a portion of information in a first level of the information organization;

determining whether a command indicating selection of one of the elements in the navigation structure has been detected;

determining whether the selected element has at least one associated element in a second level of the information organization; and if the selected element has at least one associated element in a second level of the information organization, modifying the navigation structure by deleting the non-selected first level elements from the navigation structure and inserting the second level elements associated with the selected element in the navigation structure, thereby conserving the display space while continuing to represent the information organization.

22. The article of claim 21, wherein generating a one-dimensional navigation structure for an organization of information comprises generating a user interface comprising a navigation portion, the navigation portion comprising the elements.

23. The article of claim 22, wherein deleting the non-selected first level elements and inserting the second level elements associated with the selected element comprises placing at least part of one of the associated elements in navigation portion space that was occupied by one of the non-selected elements or the selected element.

24. The article of claim 21, wherein the instructions are further operable to cause one or more machines to perform operations comprising altering the presentation of the selected first level element so that the element is presented dissimilarly to the inserted second level elements.

25. The article of claim 21, wherein the instructions are further operable to cause one or more machines to perform operations comprising performing a function or presenting data represented by the selected element if the selected element does not have at least one associated element.

26. The article of claim 21, wherein the instructions are further operable to cause one or more machines to perform operations comprising:

determining whether a command indicating selection of one of the inserted elements in the navigation portion has been detected;

determining whether the selected inserted element has at least one associated element in a third level of the information organization; and if the selected inserted element has at least one associated element in a third level of the information organization, modifying the navigation portion by deleting the non-selected second level elements from the navigation structure and inserting the third level elements associated with the selected inserted element in the navigation structure.

27. The article of claim 26, wherein the instructions are further operable to cause one or more machines to perform operations comprising altering the presentation of the selected inserted element in the navigation structure so that the element is presented dissimilarly to the inserted third level elements.

28. The article of claim 26, wherein the instructions are further operable to cause one or more machines to perform operations comprising:

determining whether a command indicating selection of a previously selected element has been detected; and modifying the navigation portion by deleting elements inserted after the selected previously selected element from the navigation structure and inserting elements in a level of the information organization below the selected previously selected element and associated with the selected previously selected element in the navigation structure.

29. A computer-implemented method for visually presenting information in a compact display space, the method comprising:

generating a user interface for presentation in the display space and comprising a navigation portion, the navigation portion comprising a plurality of elements in a first level of a hierarchy of elements;

detecting a command indicating selection of one of the elements in the navigation portion;

determining whether the selected element has at least one associated element in a second level of the hierarchy, the second level being lower than the first level; and if the selected element has at least one associated element in a second level of the hierarchy, modifying the navigation portion by deleting the non-selected first-level elements from the navigation portion and inserting the second-level elements associated with the selected element in the navigation portion, thereby conserving the display space while continuing to represent the element hierarchy.

30. The method of claim 29, further comprising altering the appearance of the selected element in the navigation portion so that the element appears dissimilar to the associated second-level elements.

31. The method of claim 29, wherein deleting the non-selected first-level elements and inserting the second level elements associated with the selected element comprises placing at least part of one of the associated elements in navigation portion space that was occupied by one of the non-selected elements or the selected element.

32. The method of claim 29, further comprising performing a function or presenting data represented by the selected element if the selected element does not have at least one associated element in the second level of the hierarchy.

33. The method of claim 29, further comprising:

detecting a command indicating selection of one of the second-level elements in the navigation portion;

determining whether the selected second-level element has at least one associated element in a third level of the hierarchy, the third level being lower than the second level; and if the selected second-level element has at least one associated element in a third level of the hierarchy, modifying the navigation portion by deleting the non-selected second-level elements from the navigation portion and inserting the third-level elements associated with the selected second-level element in the navigation portion.

34. The method of claim 33, further comprising altering the appearance of the selected second-level element in the navigation portion so that the element appears dissimilar to the associated third-level elements.

35. The method of claim 33, further comprising:
detecting a command indicating selection of an element at least two levels higher than the lowest-level element in the navigation portion; and
modifying the navigation portion by deleting elements lower than the selected higher-level element in the hierarchy from the navigation portion and inserting elements in a level of the information organization below the selected higher-level element and associated with the selected higher-level element in the navigation portion.

36. An article of manufacture comprising a physical machine-readable storage medium storing instructions operable to cause one or more machines to perform operations for visually presenting information in a compact display space, the operations comprising:
generating a user interface comprising a navigation portion, the navigation portion comprising a plurality of elements in a first level of a hierarchy of elements;
determining whether a command indicating selection of one of the elements in the navigation portion has been detected;
determining whether the selected element has at least one associated element in a second level of the hierarchy, the second level being lower than the first level; and
if the selected element has at least one associated element in a second level of the hierarchy, modifying the navigation portion by deleting the non-selected first-level elements from the navigation portion and inserting the second-level elements associated with the selected element in the navigation portion, thereby conserving the display space while continuing to represent the information organization.

37. The article of claim 36, wherein the instructions are further operable to cause one or more machines to perform operations comprising performing a function or presenting data represented by the selected element if the selected element does not have at least one associated element in the second level of the hierarchy.

38. The article of claim 36, wherein the instructions are further operable to cause one or more machines to perform operations comprising:
determining whether a command indicating selection of one of the second-level elements in the navigation portion has been detected;
determining whether the selected second-level element has at least one associated element in a third level of the hierarchy, the third level being lower than the second level; and
if the selected second-level element has at least one associated element in a third level of the hierarchy, modifying the navigation portion by deleting the non-selected second-level elements from the navigation portion and inserting the third-level elements associated with the selected second-level element in the navigation portion.

39. The article of claim 36, wherein the instructions are further operable to cause one or more machines to perform operations comprising altering the appearance of the selected second-level element in the navigation portion so that the element appears dissimilar to the associated third-level elements.

40. The article of claim 36, wherein the instructions are further operable to cause one or more machines to perform operations comprising:
determining whether a command indicating selection of an element at least two levels higher than the lowest-level element in the navigation portion has been detected; and
modifying the navigation portion by deleting elements lower than the selected higher-level element in the hierarchy from the navigation portion and inserting elements in a level of the information organization below the selected higher-level element and associated with the selected higher-level element in the navigation portion.

41. A computer-implemented method for user interface navigation in a compact display space, the method comprising:
generating a graphical user interface for presentation in the display space, the user interface comprising a navigation bar including a one-dimensional navigation structure, the navigation structure comprising a plurality of elements, each element representing data or a function in a first level of an organization of information;
detecting a command indicating selection of one of the elements in the navigation bar;
determining whether the selected element has at least one associated element in a second level of the information organization;
if the selected element has at least one associated element in a second level of the information organization, modifying the navigation bar by deleting the non-selected first level elements from the navigation bar and inserting the second level elements associated with the selected element in the navigation bar such that at least part of one of the associated elements occupies navigation bar space that was occupied by one of the non-selected elements or the selected element, and the elements associated with the selected element are appended to the selected element, thereby conserving the display space while continuing to represent the element organization;
altering the appearance of the selected element in the navigation bar so that the element appears dissimilar to the inserted second level elements;
performing a function or presenting data represented by the selected element if the selected element does not have at least one associated element;
detecting a command indicating selection of one of the inserted elements in the navigation bar;
determining whether the selected inserted element has at least one associated element in a third level of the information organization;
if the selected inserted element has at least one associated element in a third level of the information organization, modifying the navigation bar by deleting the non-selected inserted elements from the navigation bar and adding the third level elements associated with the selected inserted element to the navigation bar;
altering the appearance of the selected inserted element in the navigation bar so that the element appears dissimilar to the third level elements;
performing a function or presenting data represented by the selected inserted element if the selected inserted element does not have at least one associated third level element;
detecting a command indicating selection of a previously selected element in the navigation bar; and
modifying the navigation bar by deleting elements inserted after the selected previously selected element from the navigation bar and inserting elements in a level of the information organization below the selected previously selected element and associated with the selected previously selected element in the navigation bar.

* * * * *